Dec. 12, 1933.  A. H. CHRISTY  1,939,105
BATTERY TERMINAL CONNECTER
Filed Feb. 28, 1931
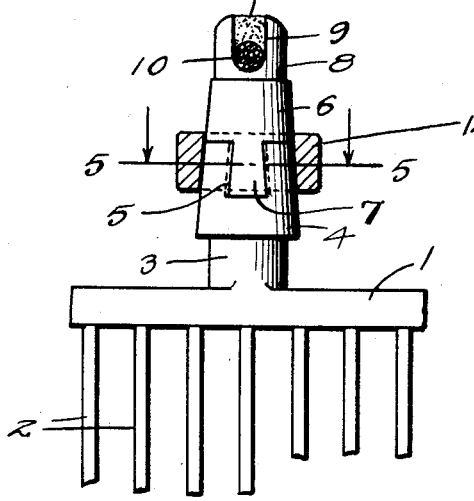
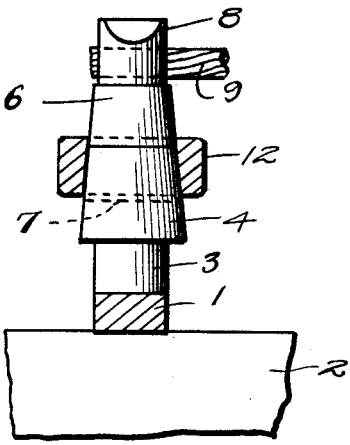
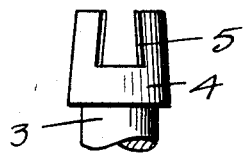
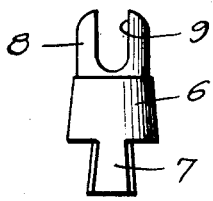
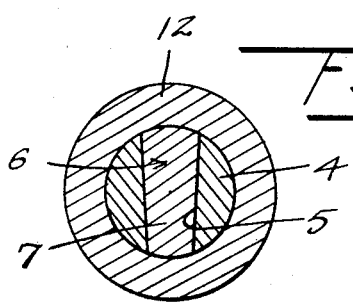
Inventor
A. H. Christy
By Watson E. Coleman
Attorney Patented Dec. 12, 1933

1,939,105

UNITED STATES PATENT OFFICE 1,939,105

BATTERY TERMINAL CONNECTER

Allen H. Christy, Wood River, Ill., assignor of forty per cent to George W. Thompson, Wood River, Ill.

Application February 28, 1931. Serial No. 519,191

1 Claim. (Cl. 173—259)

This invention relates to improvements in connecters and pertains particularly to an improved means for connecting a battery cable end with a terminal post and it is designed particularly for use in connection with storage batteries.

The primary object of the present invention is to provide improved means for connecting the end of a cable with a storage battery terminal, which does not employ any screw threads or threaded members for effecting the connection and will not, therefore, present the difficulties which are encountered when attempting to disconnect the cable from the terminal where threaded elements are employed.

It is, of course, well known that the majority of battery cables are connected to the terminal posts by means of clamps which are drawn together to the terminal post by a nut and bolt and that, through the splashing of the acid from the battery onto this connection, the threads of the bolt and nut become corroded to such an extent that it is frequently impossible to disconnect them when the clamp is to be removed from the terminal post. With the present invention a dovetail connection is made between the terminal post and the end of the battery cable, which connection is secured by a locking ring which frictionally engages about the connecting members. To effect disconnection of these members it is only necessary to shift this locking ring in one direction and then disengage the dovetail connection by slipping one of the members from the other.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a view partly in elevation and partly in section showing the device embodying the present invention applied to a group of cell plates;

Figure 2 is an applied view of the device taken at right angles to Figure 1;

Figure 3 is a detailed elevational view of the lower portion of the device;

Figure 4 is a detailed side elevational view of the upper portion of the device;

Figure 5 is a horizontal sectional view taken on the line 5—5 of Figure 1.

Referring more particularly to the drawing wherein like numerals of reference indicate corresponding parts throughout the several views, the numeral 1 indicates the bar member of a storage battery cell to which a group of the cell plates 2 are connected and to which bar the battery terminal post is also connected.

In accordance with the present invention the terminal post which is indicated generally by the numeral 3, has an enlarged head portion 4 which is of circular cross section and tapered from the lower to the upper end, as illustrated, the top being cut square across, as shown.

Transversely of the top portion of the post head there is formed the dovetail recess 5.

Associated with the post 3 is the body 6 which is also of circular cross section and tapered from one end to the other, the end of greatest width being of the same diameter as the upper or smaller end of the head 4 of the post, so that when these two members 4 and 5 are placed in end abutting relation they form a complete body of conical form. The body 6 has formed transversely of the bottom thereof the wedge 7 which is of dovetail cross section and designed to fit snugly into the slot 5. As shown in Figure 5, the slot 5 and wedge 7 are tapered slightly from one end to the other so that they can only be engaged by inserting the proper end of the wedge into one end of the slot. The upper or smaller end of the body 6 is provided with the tip 8 which is transversely slotted, as indicated at 9, to receive the end of the cable 10. After the cable has been placed in this slot it may be secured in any suitable manner, as for example by filling the slot with the solder 11.

Before securing the cable 10 to the body 6 which forms a terminal for it, there is placed about the body 6 the locking ring 12, the interior of which is of a taper corresponding to the taper of the bodies 4 and 6.

The interior of the ring is, however, of such diameter that it cannot pass over the wedge 7 when the members 4 and 6 are disconnected so that it will be readily seen that the ring cannot become disconnected from the member 6 and lost.

From the foregoing description it will be readily seen that while the members 4 and 6 form a substantially unitary structure when connected, one thereof, the member 4 forms a permanent part of the battery structure, while the other, the member 6, forms a permanent part of the cable assembly. The ring 12 also belongs with the cable assembly. In use, the wedge 7 is slipped into the slot 5 in the manner previously described and the ring 12 is then forced down so as to cover the joint between the members and substantially cover the wedge 7. The firm engagement of the members and connection of the cable with the battery terminal is thus effectively obtained.

In order to disengage the cable it is only necessary to tap the ring 12 loose so that it will slip upwardly on the member 6 after which the member may be readily disconnected from the head of the terminal post 3.

Having thus described my invention what I claim is:—

A battery cable connecter, comprising two elongated bodies designed to be assembled in end to end relation and tapered when so assembled to form a single vertically disposed post of gradually decreasing diameter from its bottom to its top, the lower one of said bodies being integral with a battery element and the upper one of said bodies being formed for connection with a cable, a dovetail tongue formed transversely of the lower end of the upper body and adapted to slidably engage in a dovetail groove formed transversely of the top of the lower body, and a ring member carried by said upper body and designed to frictionally engage about the connected bodies to cover the joint therebetween, said ring being of an interior diameter less than the greatest diameter of the upper body.

ALLEN H. CHRISTY.